Patented June 6, 1933

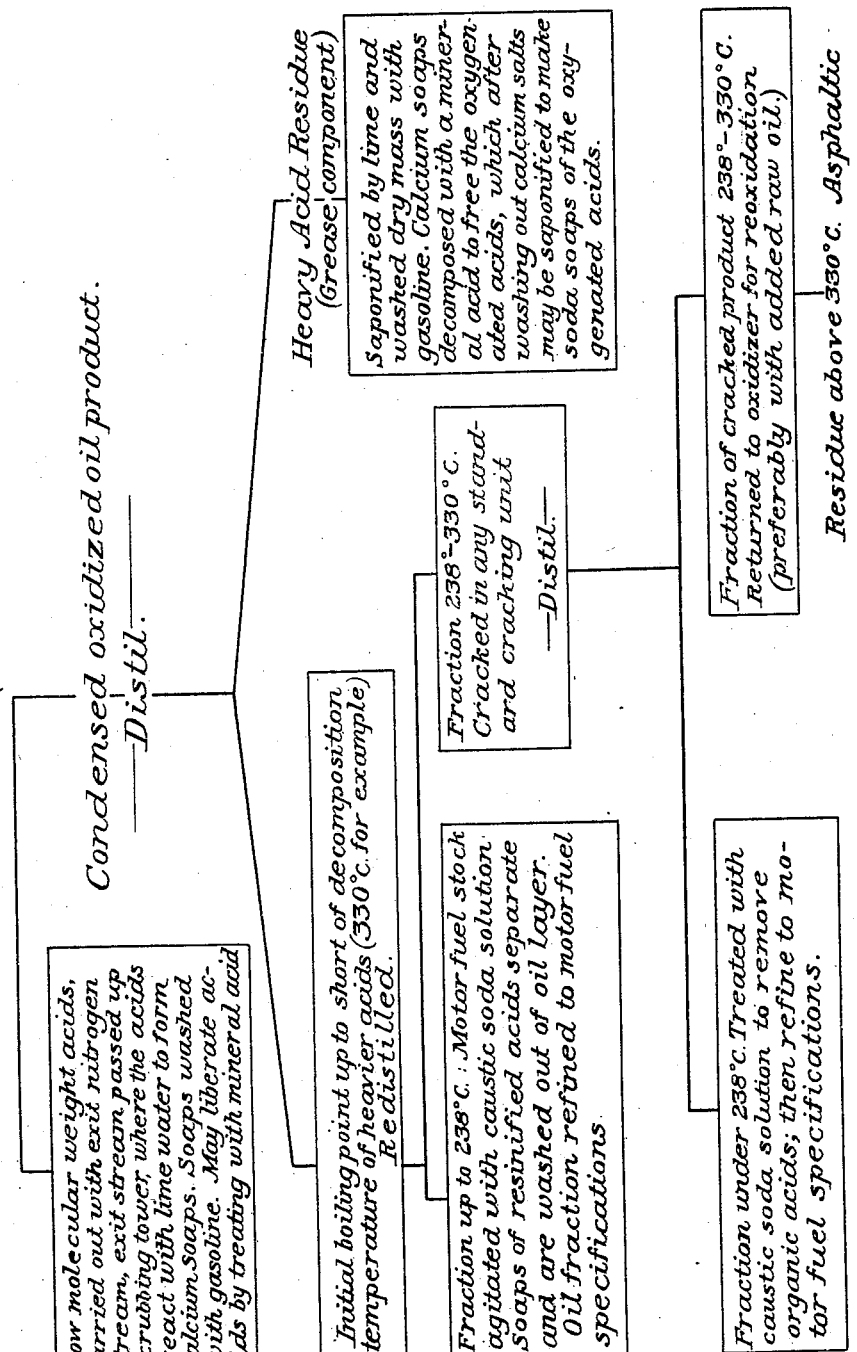

1,912,484

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

METHOD OF TREATING MIXTURES OF PARTIALLY OXIDIZED HYDROCARBONS

Application filed February 8, 1927. Serial No. 166,811.

Reference is had to the accompanying drawing showing an example of flow-sheet of a preferred form of the process.

My invention relates to treating mixtures of partially oxidized hydrocarbons, and especially those resulting from the catalytic partial oxidation of hydrocarbons, though it may be applied to such mixtures generally.

In various copending applications, I have disclosed a vapor or gaseous phase catalytic process partially oxidizing petroleums or fractions thereof, or shale oils, or the oils from the low temperature distillation of coals or the oils produced from coals by processes such as that of Bergius.

In such process, in its preferred form, the hydrocarbon is vaporized and mixed with air in regulated proportions outside the explosive range, and usually near the theoretical combining proportion. The mixture is passed, with or without the addition of a diluent, such as steam, in contact with a catalyst, such as the oxides of molybdenum, vanadium or similar oxides or complexes at a temperature below a red heat. The resulting stream is condensed and then passed through scrubbers. The recovered liquids are a complex intersolution mixture of alcohols, aldehydes, ethers, ketones and oxygenated acids and their esters and ester-like derivatives, each group containing similar bodies of different molecular weights. My present invention relates to treating such mixtures, and especially those made from the heavier liquid hydrocarbons, such as gas oil, spindle oil, wax distillate, distillable lubricating oil, or their equivalents from the other sources above recited.

First type of procedure: In carrying out my treatment, the gases after passing beyond the condenser, are passed through a series of lime tower scrubbers. In these scrubbers, lime soaps of the more volatile acids are formed, which are of a good color. Some oil adheres to these lime soaps. In working up these soaps, I may wash the dried lime soap mixtures with aliphatic gasoline to remove the oil and finally liberate the organic acids by means of a mineral acid. Since the oxygenated acids and their esters are partly resinified and are insoluble in aliphatic gasoline, I may give an additional gasoline wash to the free acids to remove any non-saponifiable oil that is still adhering to the acids.

The main portion of the product is recovered from the condenser in the form of a dark colored oil. As the next step therein, I prefer to distil the oxidized mixture almost up to the decomposition point of the heavier acids and esters that accumulate in the still. For example, I may distil up to 330° C. The still residue remaining contains from 60% to 90% of saponifiable compounds. These can be removed by lime saponification, followed by washing out the non-saponifiable oil with gasoline, as noted above.

These acids may then be liberated with a mineral acid, as described above. The purified acids are suitable as an addition in soap manufacture, and since the acids are resinous in character, they can replace ordinary resins in such cases as their use in paper sizing, cementing material in various industries, and the like.

The still residue may be used (just as it comes without any further treatment) as one of the components of a grease mixture.

Another use for this still residue, which is high in oxygenated acid content, is as an antioxident in rubber manufacture. By the addition to the rubber mix of the aldehydic oil and oxygenated acid and ester mixture, it is possible to double or treble the life of the rubber product. It appears that the addition agent protects the rubber against oxidation, probably by becoming oxidized itself. Besides the original acids present, those formed by aldehydic oxidation react with the zinc oxide and other bases ordinarily present in a rubber mix, with beneficial results.

This heavy still residue may also be used without any further treatment as a flotation oil. This use depends on its high acid and ester content, both of which have valuable frothing characteristics when applied in the flotation process. I may also form xanthates of the alcohols in this fraction, thereby improving the selective action of the flotation oil.

The oxidized oil that has been distilled over in the preparation of the heavy oil discussed above may, for the purposes of use, be redistilled, and the part that is already within the motor fuel range (under 238° C.) cut out; or this fraction may be cut out in the first distillation. The remaining oil (over 238° C. and under decomposition point as above noted) is subjected to an ordinary cracking operation, preferably in the liquid phase, such as is used in the cracking of gas oil and other hydrocarbon fractions of petroleum. I have found that the oxygenated hydrocarbons prepared by the vapor phase catalytic oxidation are more easily "cracked" down to lower molecular weight bodies. In addition, the heating of the oxidized oil under pressure results in the formation of closed ring molecules more readily, i. e. at lower temperature than is the case with the straight hydrocarbon cracking. These ring bodies of both the naphthenic and aromatic type, as well as ring bodies containing oxygen, make a motor fuel which is valuable for its non-detonating qualities.

By proper regulation of this cracking reaction (liquid phase standard cracking practice), it is possible to convert one-half of the fraction under discussion into hydrocarbons and oxygenated bodies coming within the motor fuel range. The remaining oil, having about the physical properties of gas oil, is returned to the oxidizer, preferably together with a fresh portion of raw oil, and is reoxidized as in the original operation.

In the caustic refining of the motor spirit cracked product, about 2% of resin acids is removed; and similar refining of the motor spirit fraction of the oxidation product gives usually about 3% of resin acids, giving a total of about 5% to add to the tower acids (the latter about 8%).

This first type of procedure is shown in the flow sheet drawing.

Second type of procedure: Where it is desired to increase the percentage of resin acids produced, I preferably carry out the oxidation process as above, using the lime tower system following the condenser system, thus recovering the lighter acids in the form of lime soaps. The condenser product is preferably distilled as above. The heavy acid portion (still residue above decomposition point) is then treated with lime and water to saponify all acids and ester-like bodies. The water may be removed by evaporation while the saponification is going on. After cooling, the non-saponifiable oil is removed by aliphatic gasoline, as noted in one part of the first process. From the lime soaps, the resin acids are separated by a mineral acid as usual. The non-saponifiable oil is returned to the stock for the oxidizer. Instead of cracking the intermediate distilled fraction (between about 238° C. and 330° C.), after the motor fuel portion has been removed by distillation, if desired, this fraction is preferably treated with the caustic soda to remove the saponifiable bodies. This oil mixture is then added to the charging stock for the oxidizer and rerun therein. Also, I may saponify without removing the motor fuel portion and after this saponification and removal of soaps, add the whole fraction to the charging stock for the oxidizer.

In rerunning, the yield of acid bodies is increased, and while gas losses are higher, the percentage of acid yield increases from run to run through the oxidizer. In this way, by repeated return of the intermediate fraction, as high as 60% of the original fraction can be converted into resin acids. Other of my copending applications, Ser. No. 473,798, filed May 31, 1921, and Ser. No. 702,136, filed March 26, 1924, contain claims relating to fractioning complex mixtures, such as produced by my partial oxidation process, to a resulting fraction, and to further treating such fraction. Claims thereto are not present herein.

The end points of distillation may be changed, other ways of recovering acids may be used, and many other changes may be made without departing from my invention.

I claim:

1. In the manufacture of organic products from a mixture containing a material percent of aliphatic liquid oxygenated organic products containing aliphatic derivatives having more than one carbon atom and comprising different classes of aliphatic bodies each of different molecular weights including oxygenated organic acids of different molecular weights, the steps consisting of distilling the same up to a temperature sufficient to vaporize lighter aliphatic derivatives but below the decomposition temperature of the heavier aliphatic oxygenated acids present in the mixture, and separating the heavier portion including the heavier acids.

2. In the manufacture of organic products from a mixture containing a material percent of aliphatic liquid oxygenated organic products containing aliphatic derivatives having more than one carbon atom and comprising different classes of aliphatic bodies each of different molecular weights including oxygenated organic acids of different molecular weights, the steps consisting of distilling the same up to a temperature sufficient to vaporize lighter aliphatic derivatives but below the decomposition temperature of the heavier aliphatic oxygenated acids present in the mixture, and fractioning the distillate into at least two portions of different average molecular weights.

3. In the manufacture of organic products from a mixture containing a material percent of aliphatic liquid oxygenated organic products containing aliphatic derivatives having more than one carbon atom and comprising different classes of aliphatic bodies each of different molecular weights including oxygenated organic acids of different molecular weights, the steps consisting of distilling the same up to a temperature sufficient to vaporize lighter aliphatic derivatives but below the decomposition temperature of the heavier aliphatic oxygenated acids present in the mixture, and re-oxidizing a portion of the distillate.

4. In the manufacture of organic products from a mixture containing a material percent of aliphatic liquid oxygenated organic products containing aliphatic derivatives having more than one carbon atom and comprising different classes of aliphatic bodies each of different molecular weights including oxygenated organic acids of different molecular weights, the steps consisting of distilling the same up to a temperature sufficient to vaporize lighter aliphatic derivatives but below the decomposition temperature of the heavier aliphatic oxygenated acids present in the mixture, and cracking at least a portion of the distillate.

5. In the manufacture of organic products from a mixture containing a material percent of aliphatic liquid oxygenated organic products containing aliphatic derivatives having more than one carbon atom and comprising different classes of aliphatic bodies each of different molecular weights including oxygenated organic acids of different molecular weights, the steps consisting of distilling the same up to a temperature sufficient to vaporize lighter aliphatic derivatives but below the decomposition temperature of the heavier aliphatic oxygenated acids present in the mixture, fractioning the distillate, and cracking at least a portion thereof.

6. In the manufacture of organic products from a mixture containing a material percent of aliphatic liquid oxygenated organic products containing aliphatic derivatives having more than one carbon atom and comprising different classes of aliphatic bodies each of different molecular weights including oxygenated organic acids of different molecular weights, the steps consisting of distilling the same up to a temperature sufficient to vaporize lighter aliphatic derivatives but below the decomposition temperature of the heavier aliphatic oxygenated acids present in the mixture, fractioning the distillate and re-oxidizing a portion of this distillate.

7. In the manufacture of organic products from a mixture containing a material percent of aliphatic liquid oxygenated organic products containing aliphatic derivatives having more than one carbon atom and comprising different classes of aliphatic bodies each of different molecular weights including oxygenated organic acids of different molecular weights, the steps consisting of distilling the same up to a temperature sufficient to separate lighter aliphatic derivatives but below the decomposition temperature of the heavier aliphatic oxygenated acids present in the mixture, separating the heavier fraction, and recovering motor fuel stock from the lighter fraction.

8. In the manufacture of organic products from a mixture containing a material percent of aliphatic liquid oxygenated organic products containing aliphatic derivatives having more than one carbon atom and comprising different classes of aliphatic bodies each of different molecular weights including oxygenated organic acids of different molecular weights, the steps consisting of distilling the same up to a temperature sufficient to separate lighter aliphatic derivatives but below the decomposition temperature of the heavier aliphatic oxygenated acids present in the mixture, separating the heavier fraction, and recovering motor fuel stock from the lighter fraction and refining said motor fuel stock.

9. In the manufacture of organic products from a mixture containing a material percent of aliphatic liquid oxygenated organic products containing aliphatic derivatives having more than one carbon atom and comprising different classes of aliphatic bodies each of different molecular weights including oxygenated organic acids of different molecular weights, the steps consisting of distilling the same up to a temperature sufficient to separate lighter aliphatic derivatives but below the decomposition temperature of the heavier aliphatic oxygenated acids present in the mixture, separating the heavier fraction, cutting out a fraction within the motor fuel range and refining the latter fraction.

10. In the manufacture of organic products from a mixture containing a material percent of aliphatic liquid oxygenated organic products containing aliphatic derivatives having more than one carbon atom and comprising different classes of aliphatic bodies each of different molecular weights including oxygenated organic acids of different molecular weights, the steps consisting of distilling the same up to a temperature sufficient to separate lighter aliphatic derivatives but below the decomposition temperature of the heavier aliphatic oxygenated acids present in the mixture, separating the heavier fraction, redistilling the lighter fraction and separating a fraction within the motor spirit range.

11. In the manufacture of organic products from a mixture containing a material percent of aliphatic liquid oxygenated organic products containing aliphatic derivatives having more than one carbon atom and comprising different classes of aliphatic bodies each of different molecular weights, including oxygenated organic acids of different molecular weights, the steps consisting of distilling the same up to a temperature sufficient to separate lighter aliphatic derivatives but below the decomposition temperature of the heavier aliphatic oxygenated acids present in the mixture, fractioning the distillate into at least two portions of different average molecular weights, and reoxidizing at least a portion of one of the latter fractions.

12. In the manufacture of organic products from a mixture containing a material percent of aliphatic liquid oxygenated organic products containing aliphatic derivatives having more than one carbon atom and comprising different classes of aliphatic bodies each of different molecular weights, including oxygenated organic acids of different molecular weights, the steps consisting of distilling the same up to a temperature sufficient to separate lighter aliphatic derivatives but below the decomposition temperature of the heavier aliphatic oxygenated acids present in the mixture, fractioning the distillate into at least two portions of different average molecular weights, and removing acids from one of the latter fractions.

13. In the manufacture of organic products from a mixture containing a material percent of aliphatic liquid oxygenated organic products containing aliphatic derivatives having more than one carbon atom and comprising different classes of aliphatic bodies each of different molecular weights, including oxygenated organic acids of different molecular weights, the steps consisting of distilling the same up to a temperature sufficient to separate lighter aliphatic derivatives but below the decomposition temperature of the heavier aliphatic oxygenated acids present in the mixture, fractioning the distillate into at least two portions of different average molecular weights, cracking the heavier of the latter fractions and fractioning the cracked product.

14. In the manufacture of organic products from a mixture containing a material percent of aliphatic liquid oxygenated organic products containing aliphatic derivatives having more than one carbon atom and comprising different classes of aliphatic bodies each of different molecular weights, including oxygenated organic acids of different molecular weights, the steps consisting of fractioning the same into at least three fractions, and cracking the intermediate fraction.

In testimony whereof I have hereunto set my hand.

JOSEPH HIDY JAMES.